United States Patent [19]

Miller et al.

[11] Patent Number: 4,566,939

[45] Date of Patent: Jan. 28, 1986

[54] SURFACE PREPARATION OF NICKEL BASE ALLOYS FOR BRAZING

[75] Inventors: Jule A. Miller, Derby; Jack W. Lee, Brookfield, both of Conn.; Jeffrey Thyssen, Montvale, N.J.

[73] Assignee: Avco Corporation, Stratford, Conn.

[21] Appl. No.: 694,863

[22] Filed: Jan. 25, 1985

[51] Int. Cl.[4] .................... B44C 1/22; C03C 15/00; C03C 25/06; C23F 1/00

[52] U.S. Cl. .................... 156/655; 134/2; 156/656; 156/664; 156/667; 204/141.5; 252/79.5

[58] Field of Search .................... 134/2; 156/655, 656, 156/664, 667; 252/79.5; 204/32.1, 141.5; 148/6

[56] References Cited

U.S. PATENT DOCUMENTS 1,980,042  11/1934  Dowling .................... 156/667 X
4,317,685  3/1982  Ahuja et al. .................... 134/2
4,395,303  7/1983  Weir .................... 156/664 X

FOREIGN PATENT DOCUMENTS 2120278  11/1983  United Kingdom .................... 156/667

Primary Examiner—William A. Powell
Attorney, Agent, or Firm—Ralph D. Gelling

[57] ABSTRACT

A method is disclosed for the removal of undesirable oxides from the surface of nickel-base or nickel-iron base alloys containing oxidizable aluminum and/or titanium prior to brazing. The alloy is heated in air at an elevated temperature for a time sufficient to form on the alloy surface a bilayered film comprised of a first oxide top layer containing at least titanium or aluminum and a second layer beneath the first comprised of the alloy composition substantially depleted of aluminum and/or titanium. The surface of the alloy is cleaned to remove the first oxide layer whereupon the remaining surface is in condition for brazing.

5 Claims, No Drawings

SURFACE PREPARATION OF NICKEL BASE ALLOYS FOR BRAZING

BACKGROUND OF THE INVENTION

1. Field of the Invention

This invention relates to a brazing process and more particularly to a brazing process applied to nickel-base and nickel-iron-base superalloys to obtain satisfactory joints between parts made of such materials.

2. The Prior Art

It has become increasingly important, especially in high temperature aircraft applications, such as, for example, in turbine engine parts, to use materials for structural applications that are capable of withstanding high temperatures and corrosive attacks normally associated therewith. Precipitation hardenable alloys such as nickel-base superalloys are nickel-iron-base alloys have been employed, where possible, to meet requirements of high strength-to-weight ratios, corrosion resistance, etc. at elevated temperatures. The greatest impediment to efficient use of these materials, however, has been the difficulty of obtaining satisfactory joints between parts made of such alloy materials. Brazing is normally the means whereby joints between such parts are created. Brazing consists of joining base metal surfaces by fusing (generally above 850° F.) a braze material, having a lower melting point than the subject base metal, without appreciable fusion of the base metal surfaces themselves. The brazing process depends on capillary action to draw the molten braze material into a controlled gap and wetting of the mating base metal surfaces by the molten braze material. A chief cause of brazement defects is the presence of oxides on the base metal surfaces which inhibit the flow and wetting of the molten braze material over the subject base metal surfaces. The oxide surface problem is particularly acute with precipitation hardened nickel-base and nickel-iron based superalloys in which precipitation strengthening elements such as aluminum and titanium are included in the alloy. Elements such as aluminum and titanium are relatively reactive metals and during heating to the brazing or bonding temperature readily form oxides on the base metal surface. As already discussed, the presence of these surface oxides interferes with effective brazing operations. One approach to preventing oxide build-up is to pre-plate the base metal surfaces with a very thin layer (0.0006 inch) of nickel onto the areas of the base metal to be joined prior to application thereto of the braze material and heating. However, this approach has not been entirely successful because frequently the areas to be joined are not readily accessible to nickel plating because of the joint configuration; the nickel plating is susceptible to damage during handling and assembly of the parts to be brazed and the nickel plating often will remain partially unmelted during the brazing cycle when the joint is brazed with a low melting point braze material, and the nickel plating may not properly adhere to and react with the base metal during brazing if cleaning of the base metal prior to plating is not scrupulously performed.

In recent years, significant accomplishments have been reported in vacuum hot press, solid-state diffusion bonding of superalloys such as those based on nickel. However, the presence of surface oxides also interferes with diffusion bonding of precipitation hardened nickel base and nickel-iron base superalloys. Because of the sensitivity of diffusion bonding to surface oxide formation, the base metal surfaces are nickel-phosphorus plated to prevent formation of undesirable surface oxides. Diffusion bonding of nickel-phosphorus plated parts commonly produces welded joints characterized by poor mechanical properties as compared to the base metal, the welded joint being the weakest link in the structure. The reduced mechanical properties have been attributed to the lack of chemical homogeneity in the joint region as the result of the presence of nickel-phosphorus plating layer.

It is therefore a major object of the present invention to provide an improved method for preparing the surface of a nickel-base or nickel-iron base superalloy for brazing or diffusion bonding and characterized as overcoming the above described problems.

It is a further object of the present invention to provide a method of surface preparation of precipitation hardened nickel-base or nickel-iron base superalloy substrate surfaces for brazing or diffusion bonding wherein the use of nickel plating or nickel phosphorus plating is eliminated.

SUMMARY OF THE INVENTION

The foregoing objects and others are accomplished in accordance with this invention which provides a method for preparing for brazing the surface of a nickel-base or nickel-iron-base alloy which includes at least the metal selected from aluminum and titanium, wherein the alloy prior to brazing is heated in air at an elevated temperature for a time sufficient to form on the alloy surface a bilayered film comprised of a first oxide top layer containing at least aluminum or titanium and a second layer beneath the first comprised of the alloy composition substantially depleted of titanium and/or aluminum due to oxidation of the alloy surface and then cleaning the surface of the alloy to remove the first oxide layer.

DETAILED DESCRIPTION OF THE INVENTION

According to the present invention, any nickel base alloy containing at least one metal selected from aluminum and titanium is amenable to the surface preparation process of the present invention. Suitable metals include for example, superalloys such as nickel-base and nickel-iron base superalloys. The nickel-base and nickel-iron base alloys which can be prepared for brazing through the practice of the present invention include the conventional nickel-base superalloys which are used to fabricate gas turbine components. Typically, these nickel base superalloys contain nickel to levels of about 50%, chromium to levels of about 10% primarily for oxidation resistance, aluminum and titanium in combined levels of about 5% for the formation of the strengthening gamma prime phase and refractory metals such as tungsten, molybdenum, tantalum and columbium in levels of about 5% as solid solution strengtheners. Virtually all nickel base superalloys also contain cobalt in levels of about 10%, and carbon in levels of about 0.1% which acts as a grain boundary strengthener and forms carbides which strengthen the alloy. Boron and zirconium are also often added in small amounts as grain boundary strengtheners.

The nickel-iron base superalloys differ from the nickel base superalloys in that the latter have higher service temperatures because solubility temperatures of strengthening precipitates are higher in a nickel-base matrix than in a nickel-iron matrix.

In practicing the present invention, parts are machined or otherwise formed from the nickel base or nickel-iron base alloy in the conventional manner. In precision parts, allowance is made for the metal loss that occurs during the surface preparation steps of the present invention.

The nickel-base or nickel-iron base alloy parts to be surface treated in accordance with the practice of the present invention are placed in a furnace and heated to an elevated temperature, generally in the range of about 1800° to about 2200° F. for a time sufficient, normally about 0.50 to 1.0 hours or more, to produce a bilayer film on the surface of the alloy. The heat treatment forms a first oxide layer containing aluminum and/or titanium about 0.0005 to 0.001 inch thick and a second thin layer, i.e., less than 0.001 inch thick modified alloy of metal beneath the oxide film. Due to the oxidation reaction, a concentration gradient of titanium and/or aluminum is formed due to the differences in chemical reactivities and diffusion coefficients of the elemental components of the alloy. It is believed that the second layer, due to the oxidation of the elemental titanium and/or aluminum at the surface is substantially depleted of these elements or at the very least, reduced to a bare minimum.

The so-oxidized alloy part is removed from the oxidation zone, cooled to room temperature and cleaned to effect the removal of the oxides formed in the first layer of the bilayer film on the surface of the part without removing the titanium and aluminum depleted layer. Suitable cleaning agents include strong alkaline solutions such as sodium hydroxide, potassium hydroxide, potassium permanganate or mixtures of these solutions of 2 to 3 pounds each per gallon of water solution. When using these cleaning agents, the oxidized part is immersed in each alkaline cleaner at a temperature of 180° to 200° F. for 0.5 to 1.0 hour. Optionally cleaning can be aided by the presence of a DC current. To facilitate removal of oxides from some of these alloys, the oxidized alloy parts can be immersed for about 5 to about 15 minutes in a nonelectric molten salt bath heated to about 600° C. containing about 45 to about 65% by weight potassium hydroxide, about 30 to about 45% by weight sodium nitrate and 5% by weight maximum potassium permanganate to convert the oxides to more soluble higher valence oxides, follow by immersion in alkaline solutions as above described. Removal of the oxides can also be accomplished by immersing the oxidized alloy part in an electrolytic molten salt bath composed of about 85 to about 95% by weight sodium hydroxide, about 5 to about 10% by weight sodium chloride, about 4% by weight maximum sodium fluoride, about 2% by weight maximum sodium aluminade for about 10 to about 15 minutes at 850° and 10 amperes 3 volts electrical current. Alkaline solutions and molten salt baths are preferred over acid solutions for removing the surface oxides because they do not attack or etch the base metal or remove the layer depleted of aluminum and titanium just below the oxide layer.

Removal of the oxides leaves the nickel base or nickel-iron base alloy surface substantially free of titanium and/or aluminum. The absence of these metals at the alloy surface renders the surface substantially less susceptible to further oxidation, and therefore the surface is in a superior, pristine oxide-free condition for brazing or diffusion bonding.

After the removal of the oxides, the cleaned alloy part may be joined to a similar prepared part using standard brazing or diffusion bonding processes. In brazing a bead of brazing filler metal powder mixed with an organic binder is applied to the joint edge, and the assembly is placed in a vacuum and then heated to melt the brazing material and cause the molten brazing material to flow into and wet the surface walls of the opposed parts to be joined. A preferred brazing process using nickel based filler materials is disclosed in U.S. Pat. Nos. 4,379,121, 4,394,347, 4,442,968 and 4,444,353. These patents disclose vacuum ($10^{-3}$ torr) brazing using nickel based fillers and bonding powders which braze at temperatures of 1775°–1950° F. Diffusion bonding using nickel based fillers and bonding powders may be performed at about 2000° F. for about 1–2 hours at a pressure between 1–3 ksi in either a vacuum or neutral atmosphere. After brazing or diffusion bonding, the joined component is ready for use or further processing as soon as it is cooled. For example, the component may be homogenized and aged or precipitation hardened to improve strength and other mechanical properties of the structural members being joined.

The following examples are illustrative of the invention.

EXAMPLE I

Two surfaces of a flat part formed from a commercial nickel base alloy, Inconel 718, containing 0.90% Ti and 0.50% Al, were placed in a furnace and heated in air at 2000° F. for 0.5 hour. The oxidized parts were then immersed in a cleaning bath solution of sodium hydroxide of 2–3 pounds per gallon of water at 180°–200° F. for 0.5 hour, followed by immersing in a water solution of potassium hydroxide and potassium permanganate of 2–3 pounds per gallon each at 180°–200° F. for 1 hour and then followed by immersing in a water solution of sodium hydroxide of 2–3 pounds per gallon at 180°–200° F. for 0.5 hours. The parts were removed from the cleaning bath, rinsed in tap water and then dried. A commercial nickel based brazing alloy AMS 4777, in the form of a powder mixed with an organic binder was applied to the joint edge and the assembly was brazed in vacuum ($5 \times 10^{-4}$ torr) at 1925° F. for 20 minutes. Excellent joint quality, braze alloy flow and wetting characteristics were observed.

EXAMPLE II

The procedure of Example I was repeated with the exception that a commercial nickel-iron-base alloy A286 containing 2.1% Ti, was substituted for Inconel 718, the parts to be joined were placed in a furnace and heated in air at 1900° F. for 0.5 hour and the parts were given a standard post braze precipitation heat treatment at 1325° F. for 16 hours. Excellent brazed joint quality and an average 20% improvement in shear strength compared to joints ordinarily brazed with nickel plating, i.e. the best of prior art methods, were achieved.

EXAMPLE III

The procedure of Example II was repeated with the exception that the cleaned A286 parts were joined by diffusion bonding without using any filler metal at 2000° F. for 2 hours in a vacuum at $3 \times 10^{-4}$ torr using a joint pressure of 1000 psi. An excellent quality bond was achieved.

EXAMPLE IV

The procedure of Example I was repeated with the exception that the Inconel 718 parts were placed in a furnace and heated in air at 1800° F. for 1 hour, and that the oxidized parts were cleaned in an electrolytic molten salt bath composed of 85–95% by weight sodium hydroxide, 5–10% by weight sodium chloride, 4% by weight maximum sodium fluoride, 2% by weight maximum sodium aluminade for 15 minutes at 850° F., 10 amperes and 3 volts. Excellent joint quality, braze alloy flow and wetting characteristics were observed.

EXAMPLE V

The procedure of the Example I was repeated with the exception that a commercial nickel-base alloy C101 containing 4.0% Ti and 3.4% Al was substituted for Inconel 718, that the parts were placed in a furnace and heated in air at 2150° F. for one (1) hour or 1950° F. for 4 hours, and that the oxidized parts were cleaned in an electrolytic molten salt bath composed of 85–95 percent by weight sodium hydroxide, 5–10 percent by weight sodium chloride, 4 percent by weight maximum sodium fluoride, 2 percent by weight maximum sodium aluminade for 15 minutes at 850° F., 10 amperes and 3 volts. Excellent brazed joint quality and brazing characteristics were obtained.

While specific components of the present system are defined above, many other variables may be introduced which may in any way affect, enhance or otherwise improve the system of the present invention. These are intended to be included herein.

Although variations are shown in the present application, many modifications and ramifications will occur to those skilled in the art upon reading of the present disclosure. These, too, are intended to be included herein.

We claim:

1. A method for preparing for brazing the surface of nickel-base or nickel-iron base alloys containing at least one oxidizable metal selected from the group consisting of aluminum and titanium, the method comprising heating the alloy, prior to brazing, in air at an elevated temperature for a time sufficient to form on the alloy surface a bilayered film comprised of a first oxide top layer containing at least titanium or aluminum and a second layer beneath the first comprised of the alloy composition substantially depleted of the oxidizable metal and then cleaning the surface of the alloy to remove the first oxide layer.

2. The method of claim 1 wherein the alloy is heated in air at a temperature of about 1750° to about 2200° F.

3. The method of claim 1 wherein the first oxide layer is removed by immersion of the alloy in an aqueous alkaline solution containing at least one alkaline reagent selected from the group consisting of sodium hydroxide, potassium hydroxide and potassium permanganate.

4. The method of claim 1 wherein the first oxide layer is removed by immersion of the alloy in an electrolytic molten salt bath containing at least one alkaline reagent selected from the group consisting of sodium hydroxide, sodium chloride, sodium fluoride and sodium aluminade.

5. The method of claim 1 wherein the first oxide layer is removed by immersion of the alloy in a nonelectrolytic molten salt bath containing at least one alkaline reagent selected from the group consisting of potassium hydroxide, sodium nitrate and potassium permanganate and then followed by immersion in an alkaline solution containing at least one alkaline reagent selected from the group consisting of sodium hydroxide, potassium hydroxide and potassium permanganate.

* * * * *